United States Patent [19]

Haggard et al.

[11] 4,276,646
[45] Jun. 30, 1981

[54] METHOD AND APPARATUS FOR DETECTING ERRORS IN A DATA SET

[75] Inventors: Roger L. Haggard, Garland; Jerold A. Seitchik; T. R. N. Rao, both of Dallas, all of Tex.

[73] Assignee: Texas Instruments Incorporated, Dallas, Tex.

[21] Appl. No.: 91,681

[22] Filed: Nov. 5, 1979

[51] Int. Cl.³ ............................................. G06F 11/12
[52] U.S. Cl. ...................................... 371/37; 371/39; 371/40
[58] Field of Search ............................. 371/37, 39, 40

[56] References Cited

U.S. PATENT DOCUMENTS

| | | | |
|---|---|---|---|
| 3,475,725 | 10/1969 | Frey, Jr. | 371/37 |
| 3,571,794 | 3/1971 | Tong | 371/40 X |
| 3,601,798 | 8/1971 | Hsiao | 371/37 |
| 3,775,746 | 11/1973 | Boudreau et al. | 371/39 |
| 3,988,677 | 10/1976 | Fletcher et al. | 371/40 |
| 4,117,458 | 9/1978 | Burghard et al. | 371/37 |
| 4,211,996 | 7/1980 | Nakamura | 371/37 |

OTHER PUBLICATIONS

"Megabit Bubble-Memory Chip Gets Support from LSI Family", *Electronics*, Apr. 26, 1979, pp. 105-111.

"CRC Error-Detection Schemes Ensure Data Accuracy", *Electronic Data News*, Sep. 5, 1978, pp. 119-123.
"Understanding Cyclic Redundancy Codes", *Computer Design*, Nov. 1975, pp. 93-99.

*Primary Examiner*—Jerry Smith
*Attorney, Agent, or Firm*—William E. Hiller; Melvin Sharp; James T. Comfort

[57] ABSTRACT

A method and apparatus are disclosed for detecting errors in a data set of sequential binary digits by initially separating alternating ones of the digits into data subsets and generating a cyclic redundancy code (CRC) for each data subset. After appending the CRC to the respective data subset to form corresponding code subsets, the code subsets are merged into a code set. To check for errors following any operation on the code set likely to introduce such errors, the code set is separated into the code subsets, each including the respective data subset CRC, and a CRC is generated on each code subset. Depending upon the form of the CRC generator, the code subset CRC value will indicate the presence of an error and, preferably, the location of such error. In the latter form, error correction can be conveniently performed as the data set is being reformed.

12 Claims, 3 Drawing Figures

METHOD AND APPARATUS FOR DETECTING ERRORS IN A DATA SET

BACKGROUND OF THE INVENTION

1. FIELD OF THE INVENTION

This invention relates to error detection and, particularly, to a method and apparatus for detecting errors in a data set of sequential binary digits.

2. PRIOR ART STATEMENT

It has been widely recognized that error detection is desirable in situations where a data set of sequential binary digits is operated upon in a manner having a significant probability of inadvertently altering at least one of the binary digits. Accordingly, it is common in systems requiring data transmission/reception or data recording/retrieval to incorporate an error detection scheme selected to provide a desired level of detection at an acceptable cost. For example, simple parity check techniques are generally satisfactory in byte or word oriented, data transmission and storage systems. More sophisticated polynomial or cyclic redundancy code (CRC) techniques have found use in systems which transmit or store relatively long strings of binary digits, due to an inherently lower level of redundancy. For example, the simple CRC technique discussed in "CRC Error-Detection Schemes Ensure Data Accuracy" (*Electronic Data News*, Sept. 5, 1978, pages 119–123), could be used advantageously in magnetic tape or disk systems or in magnetic bubble memory devices, since such devices generally store and retrieve data in relatively long blocks.

In some applications, an additional advantage may be realized by exploiting the inherent capability of certain of the CRC techniques to correct errors upon detection. See, Peterson and Weldon, *Error Correction Codes*, MIT Press, 2d. Ed. 1972; and Lin, *An Introduction to Error Correction Codes*, Prentice-Hall, 1970. Unfortunately, such techniques generally provide correction capability at the expense of detection. For example, one rather conventional CRC technique which has powerful error detection capability but only single bit correction is described in "Understanding Cyclic Redundancy Codes" (*Computer Design*, November 1975, pages 93–99). In contrast, a special CRC technique, known as the FIRE code, which can correct a burst of up to five consecutive errors, but at a degraded level of detection, is described in "Megabit Bubble Memory Chip Gets Support From LSI Family" (*Electronics*, Apr. 26, 1979, pages 105–111).

SUMMARY OF THE INVENTION

In the method and apparatus of the present invention a data set of sequential binary digits is separated in an alternating manner into a plurality of data subsets, and a cyclic redundancy code (CRC) is generated for, and appended to, each of the data subsets to form corresponding code subsets. After the code subsets are merged, the resulting code set may be operated upon in a manner having a significant probability of altering at least one of the binary digits in the code set. To detect such errors, the code set is separated in the same alternating manner into the code subsets, and a CRC of the same form is generated for each of the code subsets. In general, the final code subset CRC will indicate the presence of an error in the respective code subset, and, in a preferred form, the location in the code subset of a single bit error.

It is an object of the present invention to provide an improved method for detecting errors in a data set of sequential binary digits, and apparatus for the implementation thereof.

Another object of the present invention is to provide an improved method and apparatus for detecting and correcting errors in a data set of sequential binary digits.

One other object of the present invention is to provide a method and apparatus particularly well adapted for detecting and correcting bursts of errors in a data set of sequential binary digits.

Other objects and advantages of the present invention will be evident from the following detailed description when read in conjunction with the accompanying drawings.

DESCRIPTION OF THE PREFERRED EMBODIMENT

Figure 1:
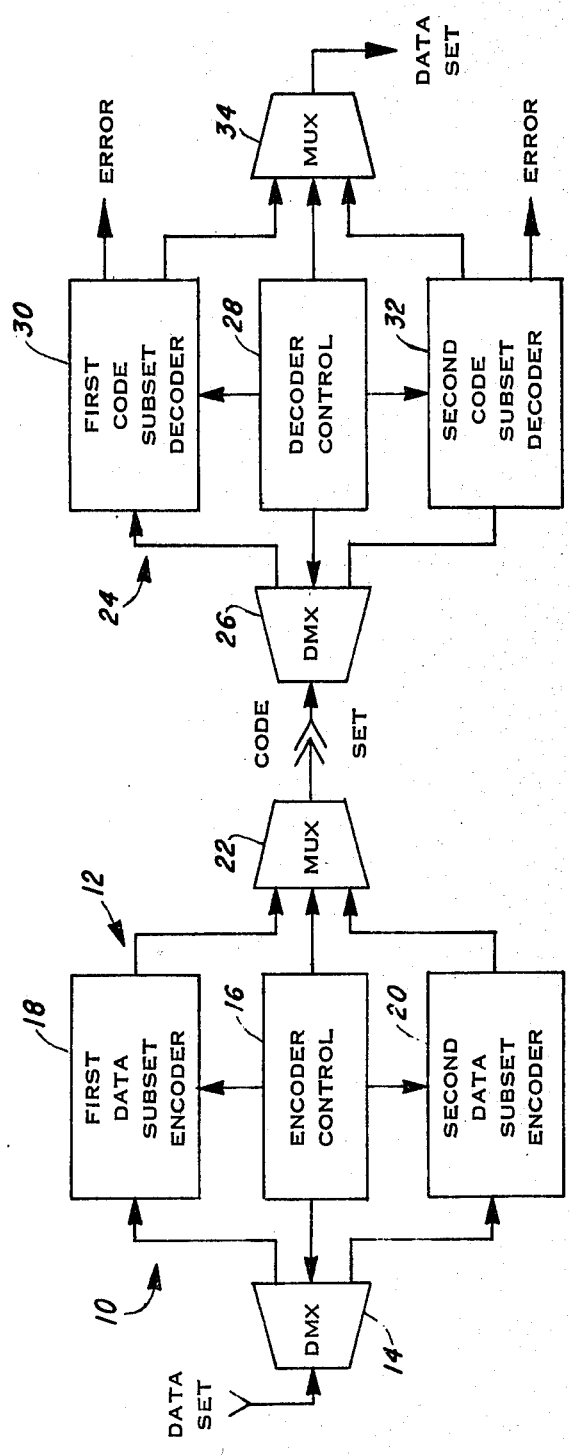
FIG. 1 is a schematic representation of an error detection and correction circuit constructed in accordance with the referred embodiment of the present invention.

Shown in FIG. 1 is an error detection and correction circuit 10 suitable for use with a data transmission system, such as a synchronous data link communication (SDLC) circuit, or with a data storage system, such as a magnetic bubble memory system. Using the latter as an example, an encoder portion 12 of the error detection and correction circuit 10 will receive a data set of sequential binary digits from a data processing system (not shown), encode the data set to produce a code set, and provide the code set for recording by the magnetic bubble memory device (not shown). More particularly, the encoder portion 12 includes a demultiplexer 14 which operates under the control of an encoder control 16 to separate alternating ones of the sequential binary digits of the data set into first and second data subsets for application to a first data subset encoder 18 and a second data subset encoder 20, respectively. In each of the first and second data subset encoders 18 and 20, respectively, a binary cyclic redundancy code (CRC) of a selected form is generated for the binary digits of the respective data subset, and appended to the end of the data subset to form corresponding code subsets, generally under the control of the encoder control 16. A multiplexer 22 operates under the control of the encoder control 16 to merge the first and second code subsets to form a code set having the sequential binary digits of the first code subset sequentially interposed between the sequential digits of the second code subset. Thus, the code set is identical to the data set except for the interdigitated data subset CRC's appended to the end thereof. In this form, the code set may be stored in a magnetic bubble memory device (not shown) in a conventional manner.

Upon retrieval of the code set from the magnetic bubble memory device (not shown), a decoder portion 24 of the error detection and correction circuit 10 receives the code set from the magnetic bubble memory device (not shown), decodes the code set to detect any errors contained therein, and provides the data set to the data processing system (not shown), together with an error signal indicative of detected errors. More particularly, the decoder portion 24 includes a demultiplexer 26 which operates under the control of a decoder control 28 to separate alternating ones of the sequential binary digits of the code set into the first and second code subsets for application to a first code subset decoder 30 and a second code subset decoder 32, respectively. In the first and second code subset decoders 30 and 32, respectively, a cyclic redundancy code (CRC) of the same selected form is generated for the binary digits of the respective code subset, and an error signal is provided when the code subset CRC has a value indicative of an error in the code subset. In the preferred form of the error detection and correction circuit 10, the first and second code subset decoders 30 and 32, respectively, of the decoder portion 24 are also capable of correcting a single random bit error in each of the respective code subsets. Thereafter, the data subset portions of the code subsets are merged by a multiplexer 34 which operates under the control of the decoder control 28 to provide the resultant data set to the digital processing system (not shown). Thus, the error detection and correction circuit 10 appears substantially transparent to the data processing system (not shown), except when an uncorrectable error has been detected.

Figure 2:
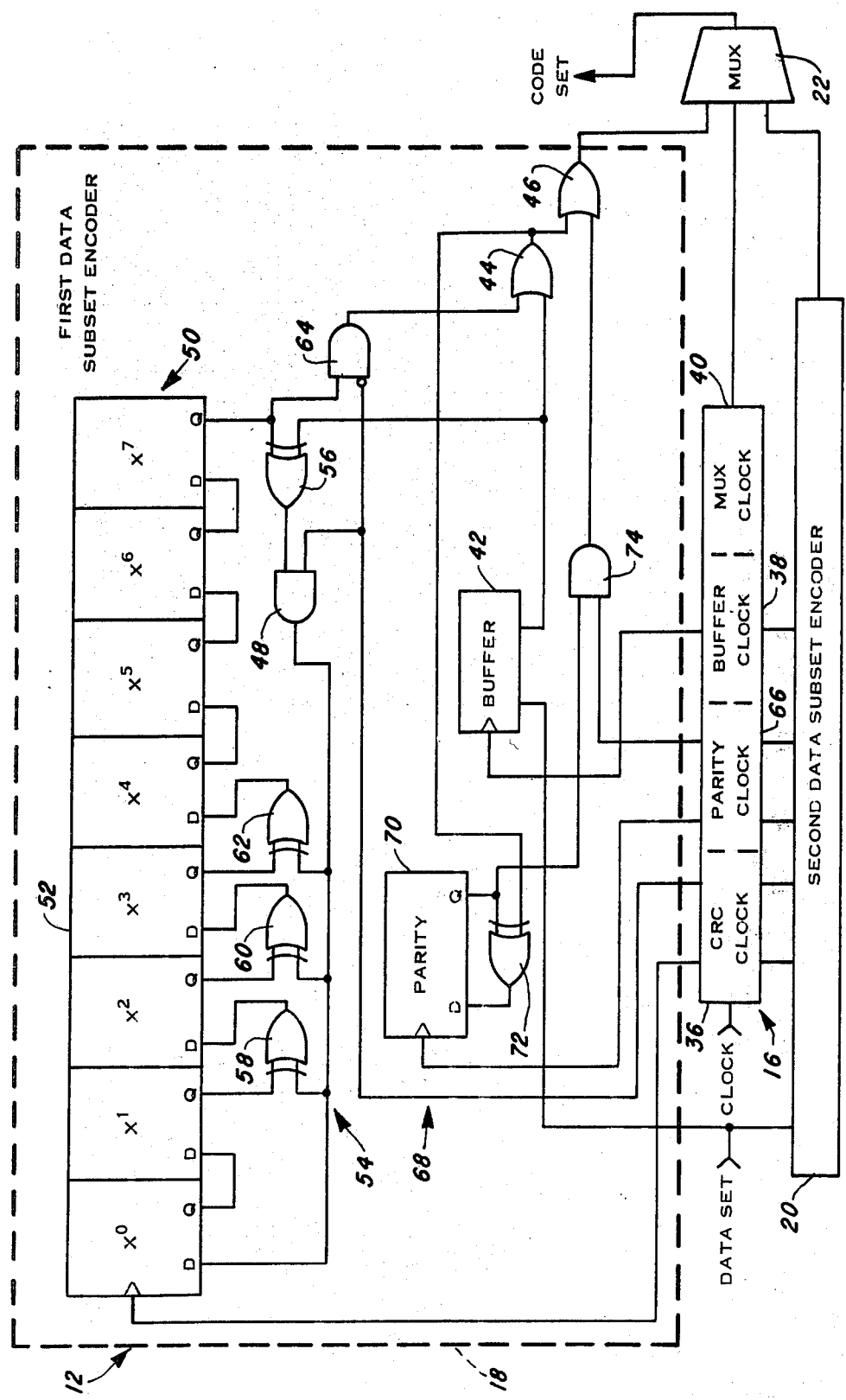
FIG. 2 is a schematic representation of the encoder portion of the error detection and correction circuit of FIG. 1.

In the preferred form of the encoder portion 12 shown in FIG. 2, the encoder control 16 comprises a CRC clock 36, a buffer clock 38, and a mux clock 40, each of which is synchronized with a master clock signal provided by the digital processing system (not shown) in synchronization with the data set. As will be apparent to those skilled in the art, the demultiplexer function performed by the demultiplexer 14 described above may be conveniently implemented by allowing the encoder control 16 to clock each of the sequential binary digits of the data set into either the first or second data subset encoders 18 or 20, respectively, at an appropriate time relative to the master clock signal. Thus, in the first data subset encoder 18, alternating ones of the sequential binary digits comprising the data set are clocked into a buffer 42 in synchronization with buffer clock pulses provided by the buffer clock 38. A predetermined number of buffer clock pulses thereafter, the data digits will be applied to the multiplexer 22 via a pair of series-connected OR gates 44 and 46. Although the buffer 42 may be of any desired size, it is particularly advantageous if the buffer 42 has sufficient capacity to retain at least one half of the data set, for reasons which will be made more apparent hereinafter.

While the buffer clock 38 is clocking the data digits out of the buffer 42, the CRC clock 36 provides a CRC generate signal to open a CRC generate gate 48 and enable operation of a CRC generator 50 on the data digits, in response to CRC clock pulses provided by the CRC clock 36 as the data digits become available at the output of the buffer 42. In general, the CRC generator 50 performs the following operation:

$$\frac{X^r D(X)}{G(X)} = Q(X) + \frac{R(X)}{G(X)}$$

where:

$$D(X) = \sum_{i=0}^{n} d_i x^{n-i}$$

n = the number of binary digits in the data subset
$d_i$ = the i'th sequentially received binary digit in the data subset
G(X) = a selected generator polynomial
r = the degree of the generator polynomial
Q(X) = the quotient polynomial (discarded)
and
R(X) = the data subset CRC In the illustrated form, the CRC generator 50 is comprised of an 8-stage shift register 52 which cooperates with a generator network 54 of four (4) EXCLUSIVE OR gates 56, 58, 60, and 62 to generate a cyclic redundancy code for the first data subset using the following generator polynomial:

$$G(X) = (X^8 + X^4 + X^3 + X^2 + 1)$$

This exemplary generator polynomial is a shortened form of a distance-4 Hamming code capable of detecting up to two (2) error bits in a string of up to 255 binary digits, and of correcting any single bit error. However, other forms of generator polynomial may be implemented in a similar manner if desired.

After the last binary digit of the data subset has been clocked out of the buffer 42 and into the CRC generator 50, the CRC clock 36 will terminate the CRC generate signal, thereby closing the CRC generate gate 48. Simultaneously, a CRC output gate 64 opens so that the next eight CRC clock pulses applied to the CRC generator 50 clock the data subset CRC contained therein through the CRC output gate 64, and the OR gates 44 and 46 to the multiplexer 22. Thus, the data subset CRC is appended to the end of the first data subset to form the corresponding code subset:

$$T(X) = D(X) + CRC$$

For reasons which will be made more apparent hereinafter, the encoder control 16 includes a parity clock 66 which provides parity clock pulses as each of the data and CRC digits is applied to the multiplexer 22 via the OR gate 44; and the first data subset encoder 18 includes a parity generator 68, responsive to the parity clock pulses, for determining the parity of the first code subset. More particularly, the parity generator 68 is comprised of a D-type flip-flop 70, and an EXCLUSIVE OR gate 72 which provides selective feedback of the output of the flip-flop 70 to the input thereof depending upon the output of the OR gate 44 when the parity clock pulse occurs. As soon as the last digit of the CRC has been applied to the multiplexer 22, the parity clock 66 will apply a parity gate signal to a parity gate 74 to transfer the output of the flip-flop 70 to the multiplexer 22 via the OR gate 46. In this manner, the final parity is simply appended to the end of the first code subset to provide overall even parity.

The second data subset encoder 20 is constructed and operates in the same manner as the first data subset encoder 18 except that the encoder control 16 applies the various clock and control signals to the second data subset encoder 20 one (1) master clock pulse later than to the first data subset encoder 18 to achieve alternating processing of the data digits. It follows therefore that the digits of the first and second code subsets will be applied in an alternating manner to the multiplexer 22. In synchronization therewith, the mux clock 40 will control the multiplexer 22 via a mux control signal so that the digits provided by the second data subset encoder 20 are sequentially interposed between the digits provided by the first data subset encoder 18. Thus, the code set provided by the multiplexer 22 is comprised of the original data set, followed by the interdigitated CRC's and parity bits.

Figure 3:
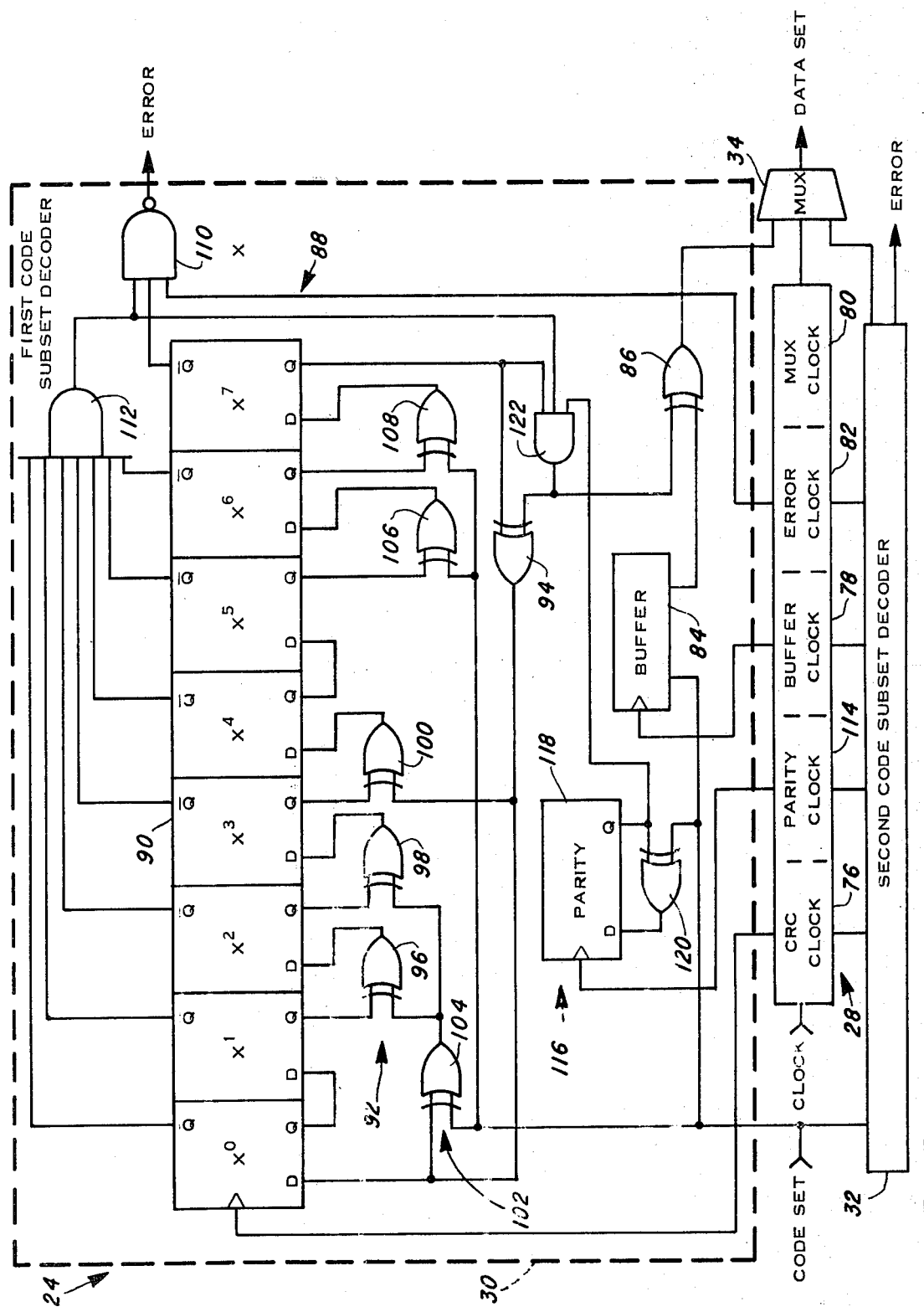
FIG. 3 is a schematic representation of the decoder portion of the error detection and correction circuit of FIG. 1.

In the preferred form of the decoder portion 24 shown in FIG. 3, the decoder control 28 comprises a CRC clock 76, a buffer clock 78, a mux clock 80, and an error clock 82, each of which is synchronized with the master clock signal provided by the digital processing system (not shown) in synchronization with the code set. As in the encoder portion 12, the demultiplexer function performed by the demultiplexer 26 described above may be conveniently implemented by allowing the decoder control 28 to clock each of the sequential binary digits of the code set into either the first or second code subset decoders 30 or 32, respectively, at an appropriate time relative to the master clock signal. Thus, in the first code subset decoder 30, alternating ones of the sequential binary digits comprising the data set portion of the code set are clocked into a buffer 84 in synchronization with buffer clock pulses provided by the buffer clock 78. A predetermined number of buffer clock pulses thereafter, the data digits will be applied to the multiplexer 34 via an EXCLUSIVE OR gate 86. To facilitate error correction, the buffer 84 should have sufficient capacity to retain at least one half of the data set, so that the first data digit is not available for output until after the last data digit has been clocked in. On the other hand, the capacity of the buffer 84 does not need to be sufficient to retain either the CRC digits or the parity digit. In the latter case, however, the buffer clock 78 will provide no buffer clock pulses as the CRC and parity digits become available.

As each of the data and CRC digits of the first code subset become available, the CRC clock 76 applies a CRC clock pulse to a CRC generator 88 to enable operation thereof. In general, the CRC generator 88 performs the following operation:

$$\frac{P(X) \, T(X)}{G(X)} = Q(X) + \frac{R(X)}{G(X)}$$

where:
P(X) = an appropriate premultiplier polynomial
T(X) = the code subset, less the parity digit
G(X) = the selected generator polynomial
Q(X) = the quotient polynomial (discarded)
and
R(X) = the code subset CRC In the illustrated form, the CRC generator 88 is comprised of an 8-stage shift register 90 which cooperates with a generator network 92 of four (4) EXCLUSIVE OR gates 94, 96, 98 and 100 to generate a cyclic rendundancy code for the first code subset using the same generator polynomial as the CRC Generator 50, that is:

$$G(X) = (X^8 + X^4 + X^3 + X^2 + 1)$$

In this form, the CRC generator 88 is capable of detecting up to two (2) error bits in a string of exactly 255 binary digits, and of correcting any single bit error therein. In the event that the combined length of the data subset and appended CRC is less than 255 digits, the CRC generator 88 must include a premultiplier network 102 to compensate for the shortened string. In the illustrated form, the premultiplier network 102 is comprised of three (3) EXCLUSIVE OR gates 104, 106, and 108 which implement the following premultiplier polynomial:

$$P(X) = (X^7 + X^6 + X^3 + X^2)$$

This exemplary premultiplier polynomial would be appropriate when the data portion of the first code subset contains 128 data digits and the CRC portion consists of 8 CRC digits. For other lengths, other appropriate forms of premultiplier polynomial may be implemented in a similar manner.

As will be clear to those skilled in the art, the final code subset CRC value, contained in the register 90 after the last digit of the CRC portion of the code subset has been clocked into the CRC generator 88, will indicate whether an error has been detected in the code subset. For the illustrated polynomials, the code subset CRC will be zero (0) if no error has been detected in the code subset, and non-zero if one or more errors have been detected in the code subset. If desired, the error clock 82 may provide an error gate signal at this time to enable an error gate 110 to produce an error signal if any of the complementary outputs of the register 90 is determined by a 7-wide AND gate 112 and the gate 110 to be non-zero. On the other hand, it may be preferable to delay production of the error gate signal until after error correction has been attempted.

Once the generation of the code subset CRC has been completed, error correction can be attempted on the data digits as each is clocked out of the buffer 84 in response to buffer clock pulses provided by the buffer clock 78. In the preferred form, error correction will be performed, if at all, as each data digit is applied to the EXCLUSIVE OR gate 86 for output to the multiplexer 34. However, since the selected generator polynomial can correct only a single error digit, it may be preferred to disable error correction if it is clear that more than one error is present. Parity checking is one convenient way to determine with confidence that at least two (2) errors have been detected, so that error correction need not be attempted. Accordingly, the decoder control 28 includes a parity clock 114 which provides parity clock pulses as each of the digits of the code subset becomes available; and the first code subset decoder 30 includes a parity generator 116, responsive to the parity clock pulses, for determining the parity of the complete code subset. More particularly, the parity generator 116 is comprised of a D-type flip-flop 118, and an EXCLUSIVE OR gate 120 which provides selective feedback of the output of the flip-flop 118 to the input thereof depending upon the particular code subset digit input to the gate 120 when the parity clock occurs. After the parity digit of the code subset has been processed by the parity generator 116, the data subset will be clocked out of the buffer 84 by the buffer clock 78, while the register 90 is being synchronously clocked by the CRC clock 76 to circulate the first code subset cyclic redundancy code through the generator network 92, thereby generating a correction cyclic redundancy code using the first code subset cyclic redundancy code. Error correction will be attempted under the control of a correct gate 122 which is responsive to the value of the correction cyclic redundancy code, as each data digit is clocked through the EXCLUSIVE OR gate 86, according to the following error conditions:

| CORREC-TION CRC | FINAL PARITY | ATTEMPT CORREC-TION? | ERROR CONDITION |
|---|---|---|---|
| 0 | EVEN | NO | NO ERRORS |
| + | EVEN | NO | EVEN # OF ERRORS |
| 0 | ODD | NO | PARITY BIT IN ERROR |
| + | ODD | YES | ODD # OF ERRORS |

In both the first and second error conditions, the correct gate 122 will be disabled by the even parity condition determined by the parity generator 116. In the third error condition, the correct gate 122 will be disabled by the zero CRC determined by the AND gate 112 and a CRC input portion of the correct gate 122. In the fourth error condition, the correct gate 122 will be enabled only when the correction CRC is equal to a predetermined detect value, and disabled otherwise. For the selected generator polynomial, the detect value is a one (1) in the MSB or $x^7$ stage of the CRC register 90, and zero (0) in all other stages thereof. However, other generaor polynomials may have different characteristic detect values.

Whenever the correct gate 122 is disabled, the EXCLUSIVE OR gate 86 simply outputs the data digits to the multiplexer 34 as they are provided by the buffer 84. However, when enabled, the correct gate 122 provides a correct signal to the EXCLUSIVE OR gate 86 to invert the data digit being provided by the buffer 84 and provide the "correct" digit to the multiplexer 34. Simultaneously, the EXCLUSIVE OR gate 94 "corrects" the correction CRC to compensate for the correction made to the data subset.

After the last data digit has been clocked out of the buffer 84 and, if appropriate, corrected for output to the multiplexer 34, the CRC clock 76 provides eight (8) additional CRC clock pulses to enable correction of an error that may have occured in the CRC portion of the code subset. Thereafter, the error clock 82 may provide the error gate signal to enable the error gate 110 to provide the error signal if the correction CRC is still non-zero, indicating an uncorrectable error.

The second code subset decoder 32 is constructed and operates in the same manner as the first code subset decoder 30 except that the decoder control 28 applies the various clock and control signals to the second code subset decoder 32 one (1) master clock pulse later than to the first code subset decoder 30 to achieve alternating processing of the digits of the code subset. It follows therefore that the digits of the first and second data subsets will be applied in an alternating manner to the multiplexer 34. In synchronization therewith, the mux clock 80 will control the multiplexer 34 via a mux control signal so that the digits provided by the second code subset decoder 32 are sequentially interposed between the digits provided by the first code subset decoder 30. Thus, the data set is provided by the multiplexer 34 in as accurate a form as possible, within the limitations of the selected generator polynomial.

From the above, it will be clear that the preferred embodiment utilizes the selected generator polynomial to detect every random single or double digit error, and all burst errors of length less than six (6). Further, all single digit and all double digit burst errors are corrected, as are 50% of all random double digit errors. In addition, however, the preferred form of the present invention can detect some burst errors of length greater than five (5), and most (87%) random triple digit errors.

In general, the interleaving technique of the present invention may be applied any number of times to improve the burst error correction capability proportionally, and the random error correction capability by a lesser amount. Of course, each additional level of interleaving will be at the expense of an additional CRC added to the end of the code set. However, the inherent symmetry between the data subset encoders and the code subset decoders allows much of the same hardware to be shared between the encoding and decoding functions. For example, the buffer 42, the CRC register 52 and associated generator network 54, and the parity generator 68 can be used as the buffer 84, the CRC register 90 and the associated generator network 92, and the parity generator 116, respectively, merely by providing conventional control gating. Similarly, the encoder control 16 and the decoder control 28 can be implemented as an integral controller using conventional design techniques, while the multiplexer 22 and the multiplexer 34 are already identical in both form and function.

Although the present invention has been described herein in a preferred form, those skilled in the art will readily perceive that changes or modifications may be made to the parts or the elements of the disclosed embodiment to adapt the present invention to other applications. However, it is intended that the scope of the present invention be determined from, and be commensurate with, the claims appended hereto.

What is claimed is:

1. A method for detecting errors in a data set of sequential binary digits, comprising the steps of:
   encoding the data set to form a code set by:
     separating alternating ones of the sequential digits of the data set into first and second data subsets;
     for each of the first and second data subsets:
       generating a binary cyclic redundancy code of a selected form for the digits of said data subset; and
       appending the digits of the data subset cyclic redundancy code to the end of said data subset to form a corresponding code subset;
     merging the first and second code subsets to form the code set, with each of the sequential digits of the first code subset being sequentially interposed between sequential digits of the second code subset;
   operating upon the code set in a manner having a significant probability of altering at least one of the digits of the code set;
   decoding the code set to detect errors therein by:
     separating alternating ones of the sequential digits of the code set into the first and second code subsets; and
     for each of the first and second code subsets:
       generating a binary cyclic redundancy code of said selected form for the digits of said code subset;
       providing an error signal in response to said code subset cyclic redundancy code having a value indicative of a error in said code subset.

2. The method of claim 1 further comprising the steps of: correcting errors detected in the code set by:
   for each of the first and second code subsets:

sequentially storing each of the data digits of said code subset upon the separation thereof from the code subset, and sequentially providing each of the stored data digits of said code subset after the code subset cyclic redundancy code for said code subset has been generated;

generating a correction cyclic redundancy code of said selected form for the respective code subset cyclic redundancy code in synchronization with the provision of each of the data digits of said code subset;

providing a correct signal when the correction cyclic redundancy code has a predetermined value indicative of an identified error in said code subset;

correcting, in response to said correct signal, the stored data digit being provided at the time the correct signal is being provided; and merging the data digits and corrected data digits of each of the first and second code subsets to form the data set, with each of the sequential data digits of the first code subset being sequentially interposed between the sequential data digits of the second code subset.

3. The method of claim 2 wherein the step of encoding the data set to form the code set further comprises the steps of:

generating, for each of the first and second code subsets, a parity digit indicative of the parity of said code subset; and appending said parity digits to the ends of the respective code subsets to provide said code subset with a predetermined parity;

wherein the step of decoding the code set to detect errors further comprises the steps of:

generating, for each of the first and second code subsets, a parity digit indicative of the parity of said code subset; and wherein the step of correcting errors detected in the code set further comprises the step of:

disabling the production of the correct signal when the parity digit generated for the respective code subset indicates a parity different from said predetermined parity.

4. The method of claim 1, 2 or 3 wherein the selected form for generating the cyclic redundancy codes, for data subsets of length less than 256 digits, comprises a generator polynomial G(X) of the form:

$$G(X) = (X^8 + X^4 + X^3 + X^2 + 1).$$

5. A method for detecting errors in a data subset of sequential binary digits, comprising the steps of:

separating alternating ones of the sequential binary digits into first and second data subsets;

generating a binary cyclic redundancy code of a selected form for each of said data subsets;

appending each cyclic redundancy code to the end of the respective data subset to form a corresponding code subset;

merging the first and second code subsets to form a code set by sequentially interposing the digits of the first code subset between the digits of the second code subset;

operating upon the code set in a manner having a significant probability of altering at least one of the digits of the code set;

separating alternating ones of the digits of the code set into the first and second code subsets;

generating a binary cyclic redundancy code of said selected form for each of said code subsets; and providing an error signal in response to a code subset cyclic redundancy code having a value indicative of an error in said code subset.

6. The method of claim 5 further comprising the steps of:

sequentially storing each of the data digits of said code subsets upon the separation thereof from the code set, and sequentially providing each of the stored data digits of said code subsets after the code subset cyclic redundancy codes for said code subsets have been generated;

generating a correction cyclic redundancy code of said selected form for each of the respective code subset cyclic redundancy codes in synchronization with the provision of each of the data ditis of said code subset;

providing a correct signal when either of the correction cyclic redundancy codes has a predetermined value indicative of an identified error in said code subset;

correcting, in response to said correct signal, the stored data digit being provided at the time the correct signal is provided, by inverting said data digit; and merging the data digits and corrected data digits of each of the first and second code subsets to form the data set, with each of the sequential data digits of the first code subset being sequentially interposed between the sequential data digits of the second code subset.

7. The method of claim 6 further defined to include the steps of:

generating, for each of the first and second code subsets upon the formation thereof, a parity digit indicative of the parity of said code subset;

appending said parity digits to the ends of the respective code subsets to provide said code subsets with a predetermined parity;

generating, for each of the first and second code subsets upon the separation thereof from the code set, a parity digit indicative of the parity of said code subset; and disabling the production of the correct signal when the parity digit generated for the respective code subset indicates a parity different from said predetermined parity.

8. The method of claim 5, 6 or 7 wherein the selected form for generating the cyclic redundancy codes, for data subsets of length less than 256 digits, comprises a generator polynomial G(X) of the form;

$$G(X) = (X^8 + X^4 + X^3 + X^2 + 1).$$

9. Apparatus for detecting errors in a data set of sequential binary digits, comprising:

data set demultiplexing means for separating alternating ones of the sequential binary digits into first and second data subsets;

data subset CRC generating means for generating a binary cyclic redundancy code of a selected form for each of said data subsets;

gating means for appending each cyclic redundancy code to the end of the respective data subset to form a corresponding code subset;

multiplexing means for merging the first and second code subsets to form a code set by sequentially interposing the digits of the first code subset between the digits of the second code subset, said multiplexing means providing the code set for operation thereon in a manner having a significant probability of altering at least one of the digits of the code set;

code set demultiplexing means for separating alternating ones of the digits of the code set into the first and second code subsets;

code subset CRC generating means for generating a binary cyclic redundancy code of said selected form for each of said code subsets; and error gating means for providing an error signal in response to a code subset cyclic redundancy code having a value indicative of an error in said code subset.

10. The apparatus of claim 9 further comprising:

register means for sequentially storing the data digits of the first and second code subsets provided by the code set demultiplexing means, and for sequentially providing the stored data digits after the code subset CRC generating means have completed the generation of the code subset cyclic redundancy codes, the code subset CRC generating means generating a correction cyclic redundancy code of said selected form for each of the respective code subset cyclic redundancy codes in synchronization with the provision by the register means of each of the data digits of said code subset;

correct gating means for providing a correct signal when either of the correction cyclic redundancy codes has a predetermined value indicative of an identified error in said code subset;

means for correcting, in response to said correct signal, the data digit being provided by the register means at the time the correct signal is provided by the correct gating means, by inverting said data digit; and multiplexing means for merging the data digits and corrected data digits of each of the first and second code subsets to form the data set, with each of the sequential data digits of the first code subset being sequentially interposed between the sequential data digits of the second code subset.

11. The apparatus of claim 10 further comprising:

data set parity generating means for generating a parity digit indicative of the parity of each of the first and second data subsets, the gating means appending said parity digits to the ends of the respective data subsets to provide each a predetermined parity; and code subset parity generating means for generating a parity digit indicative of the parity of each of the first and second code subsets provided by the code set demultiplexing means, the correct gating means being unable to produce said correct signal when the parity digit generated by the code subset parity generating means indicates a parity for the respective code subset different from said predetermined parity.

12. The apparatus of claim 9, 10 or 11 wherein each of the CRC generating means generates, for data subsets of length less than 256 digits, the respective cyclic redundancy codes via a generator polynomial G(X) of the form:

$$G(X) = (X^8 + X^4 + X^3 + X^2 + 1).$$

* * * * *